June 24, 1941.  S. R. KEEMLE  2,247,334
ELECTROTHERMIC REDUCTION OF VOLATILE METALS
Filed Sept. 23, 1940   2 Sheets-Sheet 1
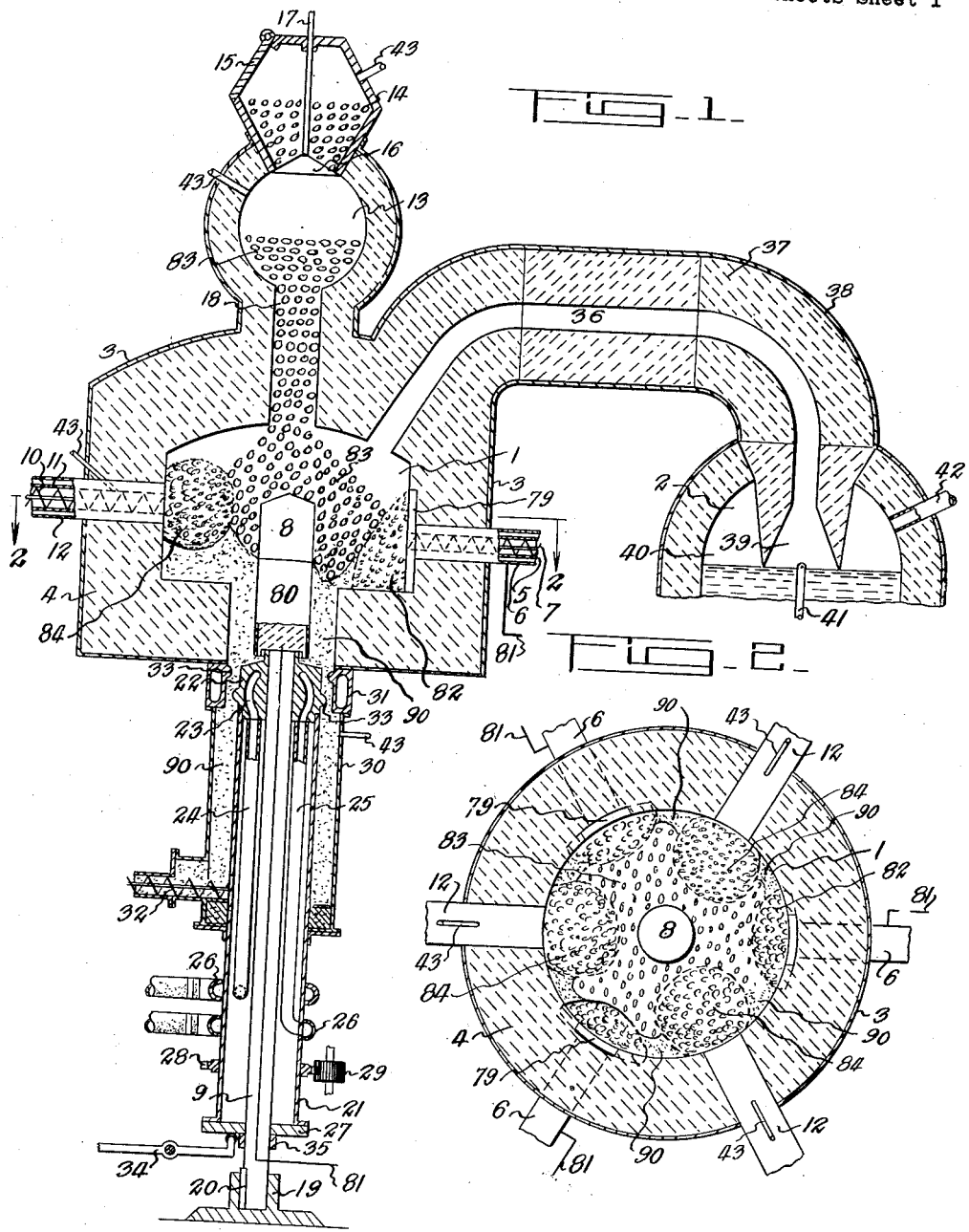
Inventor
Samuel R. Keemle
by:
Atty June 24, 1941.  S. R. KEEMLE  2,247,334
ELECTROTHERMIC REDUCTION OF VOLATILE METALS
Filed Sept. 23, 1940  2 Sheets-Sheet 2
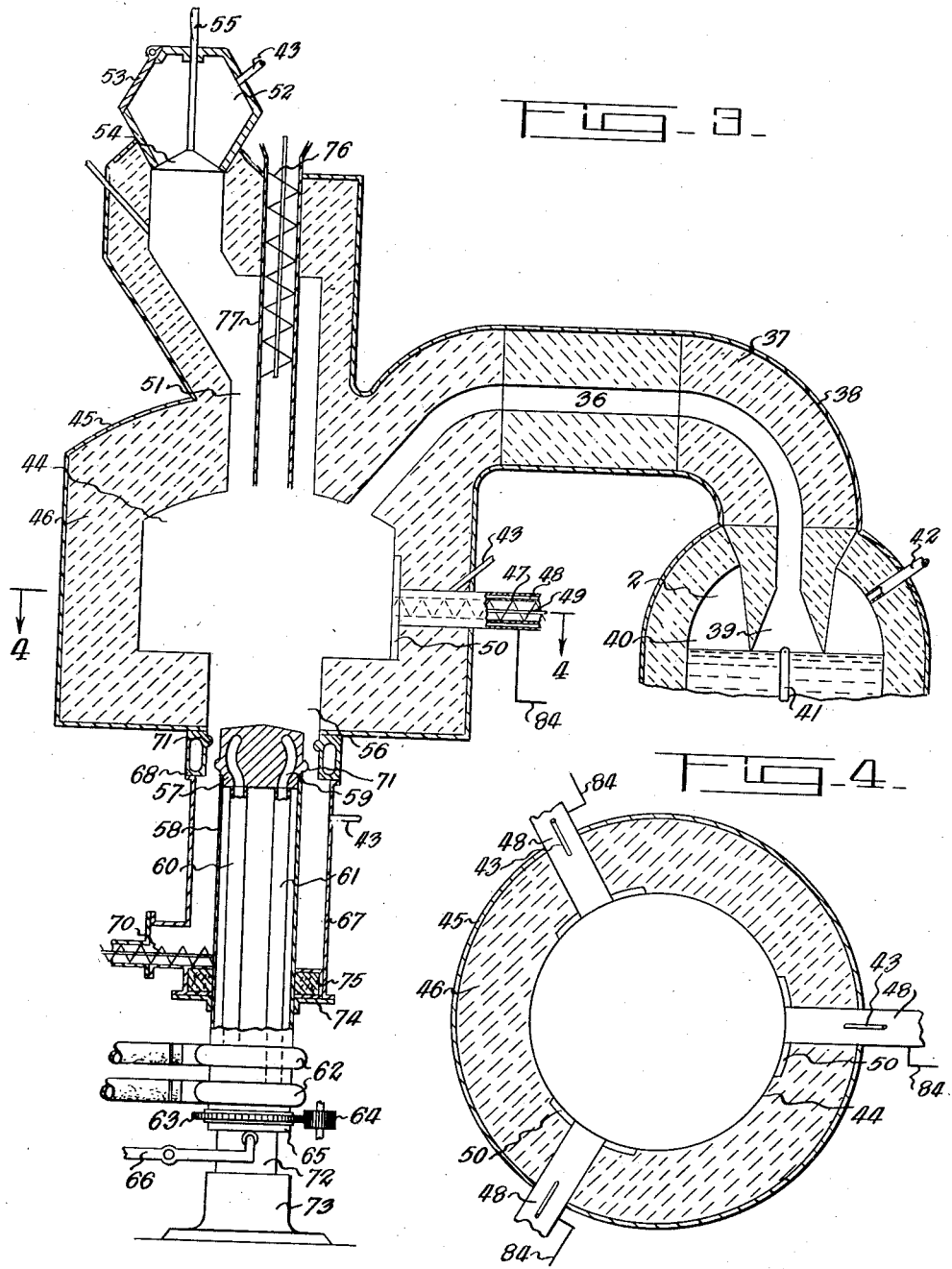
Inventor
Samuel R. Keemle Patented June 24, 1941

2,247,334

UNITED STATES PATENT OFFICE 2,247,334

ELECTROTHERMIC REDUCTION OF VOLATILE METALS

Samuel Ralph Keemle, Hamilton, Ontario, Canada, assignor to Universal Light Metals Company, Hamilton, Ontario, Canada, a partnership consisting of Joyce Mitchell McGill and Samuel Ralph Keemle Application September 23, 1940, Serial No. 357,912

10 Claims. (Cl. 13—8)

My invention relates to an improved apparatus for use in the distillation of volatile metals such as magnesium, lithium, beryllium, etc., though in this particular invention my apparatus is more especially designed for the distillation of magnesium from dolomite ore or other magnesium-bearing ores or concentrates.

A particular object of my invention is to provide an apparatus in which the volatile high-temperature vapours can be completely controlled and in which any impurities in the ore can be effectively disposed of. Another object of my invention is to use crude petroleum to shock-cool the magnesium carrying vapours given off by the furnace. At the same time as the magnesium is shock-cooled to a powder, the heat given off by the vapours is absorbed by the petroleum and serves a useful purpose in refining the petroleum.

A further object of my invention is to slowly feed a gas, such as hydrogen, into the furnace at a number of points for the purpose of creating a pressure balance within the furnace and wherein such gas will not have any detrimental effect upon the magnesium vapours being generated in the furnace.

Another object of my invention is to so design my furnace that the electrical heat producing resistance is provided for by suitably disposed charges of coke, and in which the products of distillation pass out of the furnace from the upper portions thereof and the ash is taken out of the furnace from the lower portion thereof. The furnace is also so designed that the coke charges therein may be agitated from time to time in order that they may be evenly distributed and the formation of hot points disseminated and kept under control.

With the foregoing and other objects in view as shall further appear, my invention consists of a distillation apparatus constructed and arranged all as hereinafter more particularly described and illustrated in the accompanying drawings, in which, Figure 1 is a vertical cross-sectional view through a furnace and a condenser formed and arranged in accordance with my invention.

Figure 2 is a horizontal cross-sectional view taken through the line 2—2, Figure 1.

Figure 3 is a similar view to Figure 1 showing an alternative construction of my furnace, and, Figure 4 is a horizontal cross-sectional view taken through the line 4—4, Figure 3.

Like characters of reference indicate corresponding parts in the different views of the drawings.

The apparatus as illustrated in Figures 1 and 2 comprises a furnace chamber or hearth 1 in which the volatile metal distillation takes place and a condenser chamber 2 wherein the volatile metal laden gases or vapours passing from the chamber 1 are shock-cooled and condensed into solid form. The furnace comprises a heavy steel shell 3 which is lined with a high temperature resisting refractory 4 capable of withstanding temperatures in the vicinity of 2000° C.

The furnace is of cylindrical form and is equipped with three radiating electrodes 5 which are equally spaced apart for the use of three-phase electrical current. These electrodes are preferably made of graphite and are contained within water cooled jackets 6. The electrodes are also of hollow form and each contains a screw conveyor 7 through the medium of which fine coke is injected into the furnace chamber. The inner ends of the electrodes 5 terminate in graphite plates 79 for the purpose of giving greater area for the transmission of current into the fine coke in the furnace chamber. The fourth electrode 8 provided in the capacity of a neutral is contained in an upright position in the center of the furnace chamber and is suitably supported upon a stem 9 as shall be described. This electrode is also formed of graphite or may be formed of amorphous carbon.

The furnace is also penetrated by three radial equally spaced apart water cooled worms 10. Each of the worms is contained within a suitable metal tube 11 which is contained within a water jacket 12. These worm assemblies are spaced midway between the electrodes 5 and are provided to inject a mixture of magnesium-bearing ore and coke into the furnace. The worms 10 are positioned in a higher plane than the electrodes 5. The upper end of the furnace 1 communicates with a coke dome 13 through a vertical passage 18. The dome 13 and passageway 18 are also lined with suitable refractory. The upper end of the dome 13 communicates with an airtight coke hopper 14. For filling the coke hopper a charge door 15 is mounted in the upper portion of the hopper, such door being air-tight when closed. A charging bell 16 is contained between the dome 13 and coke hopper 14 and is actuated by a rod 17 projecting upwardly from the apex of the bell through the coke hopper. The rod can be actuated by any suitable mechanism, whereby the bell can be raised and lowered in charging the coke dome 13.

The stem 9 which supports the central electrode 8 has its lower end contained within a pedestal 19. The stem 9 is retained against rotation in the pedestal 19 by a key 20 but is capable of being vertically reciprocated in the pedestal to provide for a tamping action on the resistance coke in the furnace. The stem 9 is sheathed within a cylindrical casing 21 and upon the upper end of which is carried a cast metal crown 22. This crown is cored so that the crown provides a water jacket at the upper end of the stem 9. The water circulating chamber 23 in the crown 22 is connected to inlet and outlet vertical water pipes 24 and 25 which are contained within the casing 21. The lower ends of the pipes 24 and 25 are suitably connected to a source of water supply and a water drain, and in the drawings I show ring pipes 26 surrounding the shell 21 and into which the lower ends of the pipes 24 and 25 open.

As it is desirable that the casing 21 and crown 22 be either rotated or oscillated to facilitate the drawing off of ash from the furnace, I provide any suitable means for this purpose. In the drawings I show the lower end of the casing 21 carrying an end plate 27 through which the stem 9 extends, the end plate 27 being journalled upon the stem 9. The casing 21 carries a ring gear 28 secured thereon and meshing with a driving pinion 29. The driving pinion 29 may be rotated to rotate the ring gear 28 and casing 21 or a suitable ratchet mechanism may be provided whereby the casing 21 is oscillated instead of rotated.

The upper end of the casing 21 is surrounded by an ash column housing 30, the upper end of which is attached to a water cooled cast metal ring 31 which surrounds the head 22. The space between the head 22 and the ring 31 is provided for the downward passage of ash into the ash column 30. The bottom portion of the ash column 30 is penetrated by a worm 32 by means of which the ash is withdrawn. The outer face of the crown 22 and the inner face of the ring 31 are each formed with a ridge 33 so that any lumps in the ash passing over the ridges will be broken up. At the bottom of the casing 21 is a hand or power operated lever 34 suitably positioned so that one end is contained underneath the plate 27 whereby upward movement of such end lifts the casing 21, crown 22, stem 9 and electrode 8 upwardly. When the end of the lever 34 is lowered the assembly returns to its original position, and in order to insure the stem 9 and electrode 8 moving downwardly with the casing 21, I mount a collar 35 upon the stem 9 underneath the plate 27 so that as the casing 21 and plate 27 move downwardly, they press the collar 35 and shaft 9 downwardly.

For drawing off the metal laden vapours from the furnace, a high temperature vapour outlet 36 extends from the arch of the furnace to a shock condenser. This outlet or passage 36 is also lined with a high temperature resistant refractory 37 suitably encased in a metal shell 38 and terminates in a refractory bell nozzle 39. The nozzle 39 is contained within the upper portion of a refractory lined condenser chamber 40 which contains a body of petroleum tars or bottoms. The lower edge of the bell 39 is in the vicinity of the surface of the liquid. A spray nozzle 41 projects above the surface of the liquid substantially centrallly of the bell mouth 39, and is provided to project a petroleum spray upwardly into the bell. The volatile gases from the bell nozzle 39 collect within the chamber 40 and are ejected through an outlet pipe 42 to a fractionating tower (not shown) for the condensation of gasoline, kerosene and gas-oil.

The operation of my device is as follows:

In the distillation of magnesium the following steps are taken. In carrying out my process I propose to use dolomite which is half calcium carbonate and half magnesium carbonate. After the dolomite is quarried it is crushed and rolled to practically powder form. It is then calcined in a rotary calcining furnace with the resultant removal of all the volatile matter from the dolomite, and the reduction of its weight about fifty percent. The product of the furnace should be dead-burned to a point where even the last trace of volatile matter is removed.

In setting up the plant for operation, dead-burned lime is fed into the hearth through the three ore feeding worms 10, such lime falling to the bottom of the hearth and passing downwardly past the central electrode 8 and between the crown 22 and ring 31 into and filling the ash space between the shell 30 and the casing 21, until sufficient lime is fed into the furnace to fill up the ash column space. Fine coke 82 is then delivered into the hearth through the three worm carrying electrodes 5. It will be appreciated that when the lime has been fed in through the three ore feeding worms that it, in passing to the center of the hearth to drop downwardly to the ash column, will form in three piles, each pile extending from underneath the feed worm towards the center of the hearth. A silicon carbide sleeve 80 is positioned around the lower portion of the carbon electrode 8 in order to prevent the lime from coming in contact with the carbon electrode, which under certain circumstances would convert part of the lime into carbide with corresponding consumption of the electrode.

When the fine coke is being fed into the hearth through the worm carrying electrodes only sufficient coke is injected to fill the three spaces between the three piles of lime. The hopper 14 is filled with coarse coke 83 and the coarse coke is introduced into the dome 13 from the hopper through moving the charging bell 16 downwardly. The coarse coke 83 drops downwardly through the passage 18 on to the top of the electrode 8 and spreads over the top of the fine coke and lime. The coarse coke slopes downwardly from the lower end of the passage 18 substantially as illustrated in the drawings.

When the foregoing operation has been carried out the three-phase electric current is turned on through the circuit wires 81 and in passing between the electrodes and the neutral will cause the coarse coke to heat. In order to prevent the coke from burning, the furnace is charged with a gas such as carbon monoxide. The gas is slowly injected into the furnace through a plurality of injection pressure balance pipes 43 which are located in the upper coke hopper 14, the chamber 13, the ash column and also in the six worm feeds. The electrical heating process is continued until the outlet end of the passage 36 leading to the condenser is reached by a temperature of approximately 1000° C. In order to prevent the temperature of 1000° C. passing out of the outlet pipe 42 to the refining plant, petroleum is sprayed upwardly through the spray pipe 41, the action of which spray reduces the temperature in the bell 39 to such temperatures as the refining plant is designed to withstand.

The heating of the furnace is continued until a temperature of substantially 1800° C. has progressed as far as the petroleum spray. It is, of course, to be understood that the petroleum spray is continuously increased in volume so as to counter the rising temperature of the furnace.

When the critical temperature has been attained the flow of carbon monoxide gas through the jets 43 is cut off and a slow feed of hydrogen introduced through the jets in place of the carbon monoxide. Previously to this operation 100 parts of powdered ore has been been mixed with about 40 parts of powdered coke. When the critical furnace temperature is reached, this mixture of powdered ore and powdered coke 84 is fed into the hearth through the three form feeds 11.

After the ore and coke mixture 84 has been fed into the hearth it, of course, rapidly becomes heated and due to the heat evolves a gas which is a mixture of carbon monoxide and magnesium vapour. As this gas requires a temperature of over 1800° C. for its forward passage, it is prevented from flowing into the apertures in the furnace by a slow flow of hydrogen into the several pressure balance jets, whereby a pressure balance is maintained at the face of the hearth and consequently there is no possibility of the high temperature vapours escaping from the furnace except through the outlet passage 36.

As the vapours pass along the passage 36 they enter the bell nozzle 39 at a temperature of over 1800° C. where they are met by the petroleum sprayed from the spray pipe 41. This petroleum spray is in large enough globules so it will penetrate the onrushing gas. As this gas is cooled it loses eleven-twelfths of its volume due to cooling and condensation of the magnesium to a dust, but the petroleum by volatilization takes up this lost volume. The magnesium dust then becomes coated with excess unvolatilized petroleum tars or bottoms and falls into the pool. The volatilized petroleum gases rise from this pool and are forced out to the refinery through the pipe 42.

The mixture of magnesium dust and petroleum tars is drawn off from the pool where it passes to the usual re-distillation plant wherein the magnesium is separated from the tars by distillation. If a molten tin or lead spray is used instead of petroleum tars, the magnesium will alloy with the tin or lead and this alloy can then be distilled by standard methods for the separation of magnesium. As the distillation process continues the lime which was placed in the furnace prior to commencing operations is gradually passed out of the ash column 30 by the worm 32 and its place taken by ash 90 which in its turn is removed by the worm as coke and ore is fed to the apparatus.

Figures 3 and 4 show an alternative construction of my invention wherein the furnace apparatus is furnished with three radial electrodes but wherein no central or neutral electrode is provided. This apparatus has a furnace chamber 44 in which the volatile metal distillation takes place. The furnace also comprises a heavy steel shell 45 which is lined with a high temperature resistant refractory 46 capable of withstanding temperatures in the vicinity of 2000° C. The furnace is of cylindrical form and is equipped with three radiating electrodes 47 equidistantly spaced apart for the use of three-phase electric current fed through the electrical supply wires 84. These electrodes are also preferably made of graphite and are contained within water cooled jackets 48. The electrodes are also of hollow form and each contains a screw conveyor 49 through the medium of which fine coke is injected into the furnace chamber. The inner ends of the electrodes 47 terminate in graphite plates 50 for the purpose of giving greater area for the transmission of current into the fine coke in the furnace chamber. The arch of the furnace or hearth 44 opens into a substantially vertical coke carrying passage 51 which extends downwardly from an air-tight coke hopper 52. For filling the coke hopper a charging door 53 is mounted in the upper portion thereof, such door being air-tight when closed. A charging bell 54 is contained between the upper end of the passage 51 and the coke hopper 52 and is actuated by a rod 55 which projects upwardly from the apex of the bell through the coke hopper to be actuated by any suitable mechanism whereby the bell can be raised or lowered in charging the coke dome 52.

The central portion of the hearth is formed with a downwardly extending passage 56, the lower portion of which contains a cast metal crown 57. This crown is carried upon the upper end of a vertical cylindrical casing 58 and is cored so that it provides for free water circulation. The water circulating chamber 59 in the crown 57 is connected to inlet and outlet vertical water pipes 60 and 61 which are contained within the casing 58. The lower ends of the pipes 60 and 61 are suitably connected to a source of water supply and a water drain is provided for by the ring pipes 62 surrounding the shell 58 and into which the lower ends of the pipes 60 and 16 open.

In order that the casing 58 and crown 57 be either rotated or oscillated to facilitate the drawing off of ash from the furnace, the lower end of the casing carries a ring gear 63 secured thereon and meshing with a driving pinion 64. The driving pinion 64 may be rotated to rotate the ring gear 63 and the casing 58, or a suitable ratchet mechanism may be provided where it is desired to oscillate the casing 58. The bottom of the casing 58 is closed by an end plate 65 and a hand or power operated lever 66 is suitably positioned with one end underneath the end plate 65 whereby upward movement of such end lifts the casing 58 and crown 57 upwardly. When the end of the lever 66 is lowered the assembly returns to its original position.

The casing 58 is surrounded by an ash column housing 67, the upper end of which is attached to a water cooled cast metal ring 68 which surrounds the head 57. The space between the head 57 and the ring 68 is provided for the passage of ash downwardly into the ash column 69. The bottom portion of the ash column 69 is penetrated by a worm 70 for the withdrawal of ash. The outer face of the crown 57 and the inner face of the ring 68 are each formed with a ridge 71 so that any lumps in the ash passing over the ridges will be broken up. The end plate 65 of the casing 58 is supported upon a plunger 72 slidably contained within a pedestal 73. The lower end of the shell 67 carries an end plate 74 which surrounds the casing 58 and is suitably journalled thereon with a packed bearing 74 so that the casing 58 may rotate or oscillate therein.

For feeding the mixture of ore and coke into the hearth I furnish a downwardly extending feed worm 76 centrally contained within the lower end of the passage 51 and surrounded by a tube 77. The tube 77 is of sufficient length to extend downwardly to the vicinity of the arch of the hearth.

For drawing off the metal laden vapours from the furnace, a high temperature vapour outlet 36 extends from the arch of the furnace to a shock condenser. The construction of this outlet and shock condenser is exactly the same as the construction illustrated and described in regard to the apparatus shown in Figure 1.

As this furnace is only furnished with the three coke feeding worms 49 and it is desired in starting the furnace to place lime between the three electrodes 47, the lime is placed in position in three heaps between the electrodes before the furnace is completely assembled. Before starting operations, a further supply of lime is fed downwardly through the worm 76 so that it passes through the passage 56 and from thence down into and filling the ash column space 69. This construction also incorporates a plurality of injection pressure balance pipes 43 as is provided in the construction illustrated in Figures 1 and 2. When the lime has been placed in position the same steps of starting operation take place as has been described in regard to the furnace illustrated in Figures 1 and 2.

If conditions are such that it is desired to use a single-phase current instead of a three-phase current, the construction of the furnace illustrated in Figure 1 may be slightly altered to meet this situation. In this case the three radial electrodes 5 are eliminated and a single electrode is positioned within the passage 18 and the second electrode, which corresponds to the neutral electrode 8, is made shorter so that it does not protrude above the bottom of the hearth.

From the foregoing description it will be apparent that I have devised a very compact and simple apparatus for the distillation of magnesium from magnesium-bearing ores such as dolomite, and wherein the apparatus can be operated continuously and perfect control of the temperatures and resultant gases can be maintained, and although I have shown and described certain specific embodiments of my invention, it is to be understood that I can make such changes and alterations as I may from time to time deem necessary without departing from the spirit of my invention as set forth in the appended claims.

What I claim as my invention is:

1. In an electric furnace apparatus of the character described, a furnace hearth, a plurality of spaced apart electrodes extending to the hearth, conveyors for injecting fine coke into the hearth and depositing the piled fine coke in contact with each electrode, a conveyor for injecting ore into the furnace, a coarse coke feeding hopper positioned above the furnace and from which coarse coke is deposited within the furnace on top of the conveyor-fed coke and the ore and forms a heat producing electrical resistance, an ash column extending downwardly from the bottom of the hearth, means contained within the ash column for agitating the coke within the furnace to break unwanted arcs in the coke electrical resistance, a plurality of pressure balance pipes leading into the apparatus at various spaced apart points and through which non-oxidizing gases are fed to maintain a pressure balance at the openings into the hearth of the furnace, and a passage extending from the upper portion of the furnace hearth through which the metallic laden vapours pass.

2. In an electric furnace apparatus of the character described, a furnace hearth, a plurality of spaced apart electrodes extending to the hearth, conveyors for injecting fine coke into the hearth and depositing the piled fine coke in contact with each electrode, a conveyor for injecting ore into the furnace, a coarse coke feeding hopper positioned above the furnace and from which coarse coke is deposited within the furnace on top of the conveyor-fed coke and the ore and forms a heat producing electrical resistance, an ash column extending downwardly from the bottom of the hearth, a turnable and vertically movable element contained within the ash column for facilitating the passage of ash downwardly through the ash column and for agitating the coke within the furnace to break unwanted arcs in the coke electrical resistance, a plurality of pressure balance pipes leading into the apparatus at various spaced apart points and through which non-oxidizing gases are fed to maintain a pressure balance at the openings into the hearth of the furnace, and a passage extending from the upper portion of the furnace hearth through which the metallic laden vapours pass.

3. In an electric furnace apparatus of the character described, a furnace hearth, a plurality of spaced apart electrodes extending to the hearth, conveyors for injecting fine coke into the hearth and depositing the piled fine coke in contact with each electrode, a conveyor for injecting ore into the furnace, a coarse coke feeding hopper positioned above the furnace and from which coarse coke is deposited within the furnace on top of the conveyor-fed coke and the ore and forms a heat producing electrical resistance, an ash column extending downwardly from the bottom of the hearth, means contained within the ash column for agitating the coke within the furnace to break unwanted arcs in the coke electrical resistance, a plurality of pressure balance pipes leading into the apparatus at various spaced apart points and through which non-oxidizing gases are fed to maintain a pressure balance at the openings into the hearth of the furnace, a passage extending from the upper portion of the furnace hearth through which the metallic laden vapours pass, a bell nozzle in which the passage terminates, and a liquid spray projected into the nozzle to shock-cool the metallic laden vapours.

4. In an electric furnace apparatus of the character described, a furnace hearth, a plurality of spaced apart electrodes extending to the hearth, conveyors contained within the electrodes and injecting fine coke into the hearth and depositing the piled fine coke in contact with each electrode, a conveyor for injecting ore into the furnace, a coarse coke feeding hopper positioned above the furnace and from which coarse coke is deposited within the furnace on top of the conveyor-fed coke and the ore and forms a heat producing electrical resistance, an ash column extending downwardly from the bottom of the hearth, means contained within the ash column for agitating the coke within the furnace to break unwanted arcs in the coke electrical resistance, a plurality of pressure balance pipes leading into the apparatus at various spaced apart points and through which non-oxidizing gases are fed to maintain a pressure balance at the openings into the hearth of the furnace, a passage extending from the upper portion of the furnace hearth through which the metallic laden vapours pass, a bell nozzle in which the passage terminates, and a liquid spray projected into the nozzle to shock-cool the metallic laden vapours.

5. In an electric furnace apparatus of the character described, a furnace hearth, three three-phase electrodes extending to the hearth, a fourth neutral electrode contained within the central portion of the hearth, three conveyors each contained within a three-phase electrode and injecting fine coke into the hearth and depositing the piled fine coke in contact with each electrode, conveyors for injecting ore into the furnace and positioned between the electrodes, a coarse coke feeding hopper positioned above the furnace and from which coarse coke is deposited within the furnace on top of the conveyor-fed coke and ore and forms a heat producing electrical resistance, an ash column extending downwardly from the bottom of the hearth, means contained within the ash column for agitating the coke within the furnace to break unwanted arcs in the coke electrical resistance, a plurality of pressure balance pipes leading into the apparatus at various spaced apart points and through which non-oxidizing gases are fed to maintain a pressure balance at the openings into the hearth of the furnace, and a passage extending from the upper portion of the furnace hearth through which the metallic laden vapours pass.

6. In an electric furnace apparatus of the character described, a furnace hearth, three three-phase electrodes extending to the hearth, a fourth neutral electrode contained within the central portion of the hearth, three conveyors each contained within a three phase electrode and injecting fine coke into the hearth and depositing the piled fine coke in contact with each electrode, conveyors for injecting ore into the furnace and positioned between the electrodes, a coarse coke feeding hopper positioned above the furnace and from which coarse coke is deposited within the furnace on top of the conveyor-fed coke and ore and forms a heat producing electrical resistance, an ash column extending downwardly from the bottom of the hearth, a turnable and vertically movable element upon the upper end of which the neutral electrode is carried, said element being contained within the ash column for facilitating the passage of ash downwardly through the ash column and for agitating the coke within the furnace to break unwanted arcs in the coke electrical resistance, a plurality of pressure balance pipes leading into the apparatus at various spaced apart points and through which non-oxidizing gases are fed to maintain a pressure balance at the openings into the hearth of the furnace, and a passage extending from the upper portion of the furnace hearth and through which the metallic laden vapours pass.

7. In an electric furnace apparatus of the character described, a furnace hearth, three three-phase electrodes extending to the hearth, a fourth neutral electrode contained within the central portion of the hearth, three conveyors each contained within a three-phase electrode and injecting fine coke into the hearth and depositing the piled fine coke in contact with each electrode, conveyors for injecting ore into the furnace and positioned between the electrodes, a coarse coke feeding hopper positioned above the furnace and from which coarse coke is deposited within the furnace on top of the conveyor-fed coke and ore and forms a heat producing electrical resistance, an ash column extending downwardly from the bottom of the hearth, a turnable and vertically movable element upon the upper end of which the neutral electrode is carried, said element being contained within the ash column for facilitating the passage of ash downwardly through the ash column and for agitating the coke within the furnace to break unwanted arcs in the coke electrical resistance, a plurality of pressure balance pipes leading into the apparatus at various spaced apart points and through which non-oxidizing gases are fed to maintain a pressure balance at the openings into the hearth of the furnace, a passage extending from the upper portion of the furnace hearth and through which the metallic laden vapours pass, a bell nozzle in which the passage terminates, and a liquid spray projected into the nozzle to shock-cool the metallic laden vapours.

8. In an electric furnace apparatus of the character described, a furnace hearth, three three-phase electrodes extending to the hearth, a fourth neutral electrode contained within the central portion of the hearth, three conveyors each contained within a three-phase electrode and injecting fine coke into the hearth and depositing the piled fine coke in contact with each electrode, conveyors for injecting ore into the furnace and positioned between the electrodes, a coarse coke feeding hopper positioned above the furnace and from which coarse coke is deposited within the furnace on top of the conveyor-fed coke and ore and forms a heat producing electrical resistance, an ash column extending downwardly from the bottom of the hearth, a turnable and vertically movable element upon the upper end of which the neutral electrode is carried, said element being contained within the ash column for facilitating the passage of ash downwardly through the ash column and for agitating the coke within the furnace to break unwanted arcs in the coke electrical resistance, a plurality of pressure balance pipes leading into the apparatus at various spaced apart points and through which non-oxidizing gases are fed to maintain a pressure balance at the openings into the hearth of the furnace, a passage extending from the upper portion of the furnace hearth and through which the metallic laden vapours pass, a bell nozzle in which the passage terminates, a condenser chamber in which the bell nozzle is contained, a body of petroleum tars or bottoms contained within the chamber, and a spray nozzle directed towards the bell nozzle and through which the petroleum tars are sprayed to commingle with and shock-cool the metallic laden vapours in the bell nozzle.

9. In an electric furnace apparatus of the character described, a furnace hearth, a plurality of spaced apart electrodes extending to the hearth, conveyors for injecting fine coke into the hearth and depositing the piled fine coke in contact with each electrode, a conveyor for injecting a mixture of powdered ore and powdered coke into the furnace, a coarse coke feeding hopper positioned above the furnace and from which coarse coke is deposited within the furnace on top of the conveyor-fed coke and the ore and forms a heat producing electrical resistance, an ash column extending downwardly from the bottom of the hearth, means contained within the ash column for agitating the coke within the furnace to break unwanted arcs in the coke electrical resistance, a plurality of pressure balance pipes leading into the apparatus at various spaced apart points and through which non-oxidizing gases are fed to maintain a pressure balance at the openings into the hearth of the furnace, a passage extending from the upper portion of the furnace hearth through which the metallic laden vapours pass, a bell nozzle in which the passage terminates, a condenser chamber in which the bell nozzle is contained, a body of petroleum tars or bottoms contained within the chamber, and a spray nozzle directed towards the bell nozzle and through which the petroleum tars are sprayed to commingle with and shock-cool the metallic laden vapours in the bell nozzle.

10. In an electrical furnace apparatus of the character described, a furnace hearth, a plurality of spaced apart electrodes extending to the hearth, conveyors for injecting fine coke into the hearth and depositing the piled fine coke in contact with each electrode, a conveyor for injecting a mixture of powdered ore and powdered coke into the furnace, a coarse coke feeding hopper positioned above the furnace and from which coarse coke is deposited within the furnace on top of the conveyor-fed coke and the ore and forms a heat producing electrical resistance, an ash column extending downwardly from the bottom of the hearth, a turnable and vertically movable element contained within the ash column for facilitating the passage of ash downwardly through the ash column and for agitating the coke within the furnace to break unwanted arcs in the coke electrical resistance, a plurality of pressure balance pipes leading into the apparatus at various spaced apart points and through which non-oxidizing gases are fed to maintain a pressure balance at the openings into the hearth of the furnace, a passage extending from the upper portion of the furnace hearth through which the metallic laden vapours pass, a bell nozzle in which the passage terminates, a condenser chamber in which the bell nozzle is contained, a body of petroleum tars or bottoms contained within the chamber, and a spray nozzle directed towards the bell nozzle and through which the petroleum tars are sprayed to commingle with and shock-cool the metallic laden vapours in the bell nozzle.

SAMUEL RALPH KEEMLE.